March 17, 1931. J. T. SMALLWOOD 1,796,485
AUTOMOBILE LAMP
Filed Aug. 31, 1929
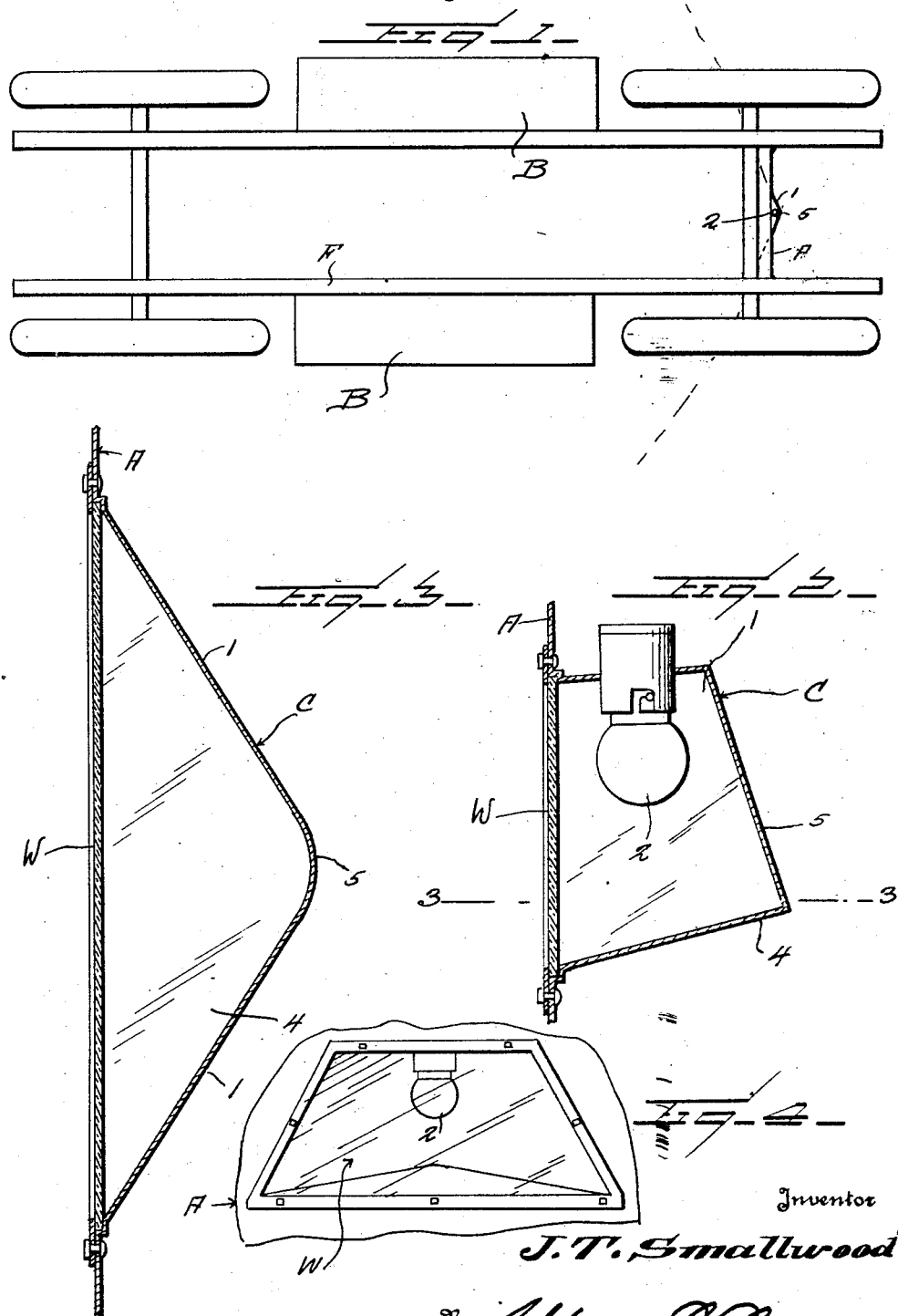
Inventor
J. T. Smallwood
By Watson E. Coleman
Attorney Patented Mar. 17, 1931

1,796,485

UNITED STATES PATENT OFFICE

JAMES T. SMALLWOOD, OF CHATTANOOGA, TENNESSEE

AUTOMOBILE LAMP

Application filed August 31, 1929. Serial No. 389,825.

This invention relates to an automobile lamp, and it is an object of the invention to provide a device of this kind so positioned with respect to the vehicle to cause said vehicle, after nightfall, to appear substantially in silhouette, thus minimizing the liability of the vehicle being struck by a passing vehicle.

Another object of the invention is to provide a device of this kind so positioned with respect to the vehicle to assure an effective illumination below the body of the vehicle to cause said vehicle, after night fall, to stand out substantially in silhouette and also bring out in conspicuity the foot boards of the vehicle.

An additional object of the invention is to provide an illuminating means positioned at the forward portion of the vehicle, and preferably carried or operatively supported by the radiator apron, said means being so constructed and assembled to throw rays of light rearwardly and downwardly below the body of the car and to opposite sides thereof.

The invention consists in the details of construction and in the combination and arrangement of the several parts of my improved automobile lamp whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawing wherein :—

Figure 1 is a diagrammatic view in top plan illustrating a vehicle having applied thereto an illuminating means constructed in accordance with an embodiment of my invention;

Figure 2 is a fragmentary vertical sectional view taken through the illuminating member or lamp as herein disclosed and the adjacent portion of the radiator apron;

Figure 3 is a sectional view taken substantially on the line 3—3 of Figure 2.

Figure 4 is a fragmentary view in elevation of the central portion of a front apron for an automobile and the associated lamp structure.

As disclosed in the accompanying drawing, A denotes an apron or its equivalent which is arranged below or depends from the frame of a motor driven vehicle. This apron A carries an illuminating medium positioned at substantially the transverse center of the frame F of the vehicle proper and which medium serves to throw rays of light downwardly and rearwardly of the vehicle below the frame and body thereon to effect an illumination on the road surface extending beyond opposite sides of the vehicle as diagrammatically indicated by broken lines in Figure 1, so that after nightfall the vehicle will be brought out substantially in silhouette. By this character of illumination the liability of the vehicle being struck by a passing car is substantially eliminated.

This illumination also serves to bring out in conspicuity the running or foot boards B of the vehicle and thus minimizing the liability of injury to a person leaving or entering the car.

In the present embodiment of my invention and as illustrated in the accompanying drawing, the lower central portion of the apron A is formed to provide a lamp casing C, said casing having an open face disposed rearwardly of the vehicle. This open face is adapted to have arranged thereover the window W of desired transparent material, preferably glass.

This casing C has two side walls 1 converging forwardly or in a direction away from the window W and meeting at substantially the longitudinal center of such window. The angle of inclination of each of the walls 1 is such to assure the desired effective diffusion in opposite lateral directions of the light beams emitting from the illuminating unit 2, herein disclosed as a conventional incandescent lamp, adapted to have communication in any desired manner with the required electrical energy.

The top wall 3 of the casing is disposed upwardly and outwardly on a slight incline in order to assure the most effective downward and rearward throw of light rays, while the bottom wall 4 of the casing is disposed upwardly and forwardly on an angle of inclination approximating thirty degrees to facilitate the desired throw of the light rays to effect the desired illumination of the under portions of the vehicle so that said vehicle after nightfall will be brought out substantially in silhouette.

The forward portion 5 of the casing, and as comprised in the junction between the walls 1, is disposed upwardly and rearward on an incline to further assure the desired rearward and lateral distribution of the light rays.

It is also to be understood that the inner faces of the walls 1, 3 and 4 of the casing C constitute reflecting surfaces which may be produced as desired. It is also to be understood that my improved lamp will be an aid to vehicles passing on either side of a vehicle so equipped, as the roadway will be illuminated from ten to fifteen feet on either side of the car.

From the foregoing description it is thought to be obvious that an automobile lamp constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a vehicle, a lamp casing supported by the forward portion of the vehicle below the body, said casing facing rearwardly of the vehicle and having side walls converging in a direction forwardly of the vehicle, and an illuminating unit within the casing, the bottom wall of the casing being upwardly and forwardly inclined, the top wall of the casing being forwardly and upwardly inclined on an angle less than the angle of inclination of the bottom wall.

2. In combination with a vehicle, a lamp casing supported by the forward portion of the vehicle below the body, said casing facing rearwardly of the vehicle and having side walls converging in a direction forwardly of the vehicle, and an illuminating unit within the casing, the bottom wall of the casing being upwardly and forwardly inclined, the forward portion of the casing being disposed on an upward and rearward incline.

3. A front apron for a vehicle having a lamp casing formed as a part thereof.

4. A front apron for a vehicle having a lamp casing formed as a part thereof, said casing facing rearwardly when the apron is in applied position.

5. A front apron for a vehicle having a lamp casing formed as a part thereof, said casing facing rearwardly when the apron is in applied position, said casing being positioned at substantially the transverse center of the vehicle to which the apron is applied.

6. In combination with a vehicle and with a front apron therefor, said apron having a rearwardly facing lamp casing formed as a part thereof, said casing having side walls converging in a direction forwardly of the vehicle, and an illuminating unit within the casing.

In testimony whereof I hereunto affix my signature.

JAMES T. SMALLWOOD.